United States Patent
Polido et al.

(10) Patent No.: US 10,611,580 B1
(45) Date of Patent: Apr. 7, 2020

(54) CONCENTRIC SUCTION CUP ARRAY INCLUDING ACTUATORS AND COMPLIANCE

(71) Applicant: Amazon Technologies, Inc., Seattle, WA (US)

(72) Inventors: Felipe De Arruda Camargo Polido, North Reading, MA (US); Scott Hopkinson, Concord, MA (US); Leonard Thomas Lilliston, III, Roxbury, MA (US); Michael James O'Connor, Charlestown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/009,778

(22) Filed: Jun. 15, 2018

(51) Int. Cl.
    *B65G 47/91* (2006.01)
(52) U.S. Cl.
    CPC ......... *B65G 47/918* (2013.01); *B65G 47/912* (2013.01); *B65G 47/917* (2013.01)
(58) Field of Classification Search
    CPC .. B25J 15/0625; B25J 15/065; B25J 15/0683; B25J 15/06; B65G 47/918; B65G 49/061; B65G 47/917; B65G 47/912; B66C 1/0237; B66C 1/0287; B66C 1/0281
    See application file for complete search history.

(56) References Cited

U.S. PATENT DOCUMENTS

| | | | | |
|---|---|---|---|---|
| 4,743,159 A | * | 5/1988 | Inamori | B62D 65/02 414/737 |
| 2010/0074720 A1 | * | 3/2010 | Taylor | B25J 15/0019 414/412 |
| 2011/0072930 A1 | * | 3/2011 | Bayer | B25J 19/0012 74/490.01 |
| 2014/0205403 A1 | * | 7/2014 | Criswell | B25J 5/007 414/395 |
| 2015/0063972 A1 | * | 3/2015 | Girtman | B25J 9/0093 414/796.9 |

* cited by examiner

*Primary Examiner* — Stephen A Vu
(74) *Attorney, Agent, or Firm* — BakerHostetler

(57) ABSTRACT

An end-of-arm tool includes concentric rings of suction cups. The pneumatic actuators control the extension of suction cups, and are actuated in rings. Each suction cup is longitudinally retractable in response to a force applied to an item and has a compliant suction cup. Each ring has a vacuum control. Each ring can have its own compliance.

18 Claims, 18 Drawing Sheets

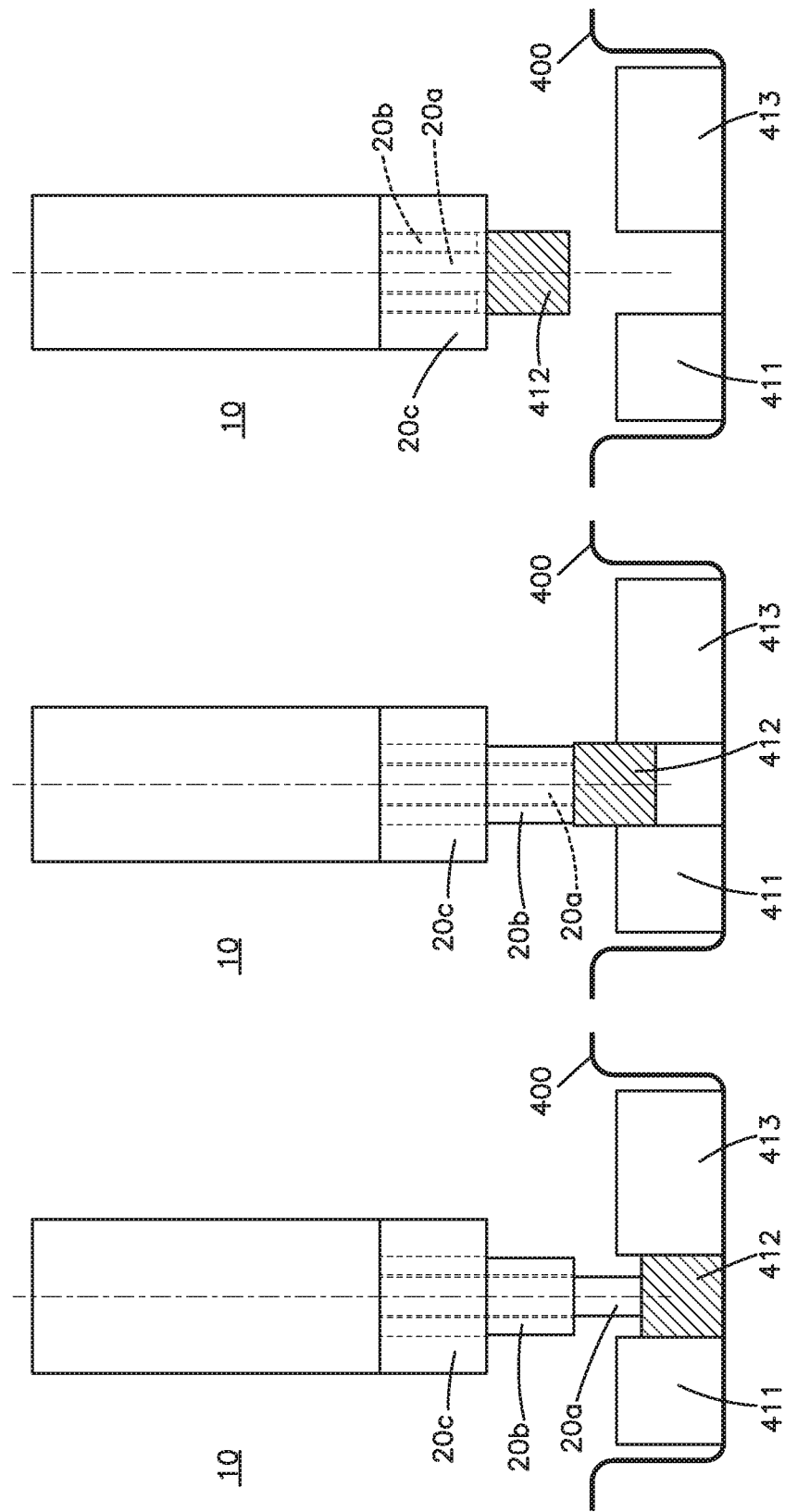

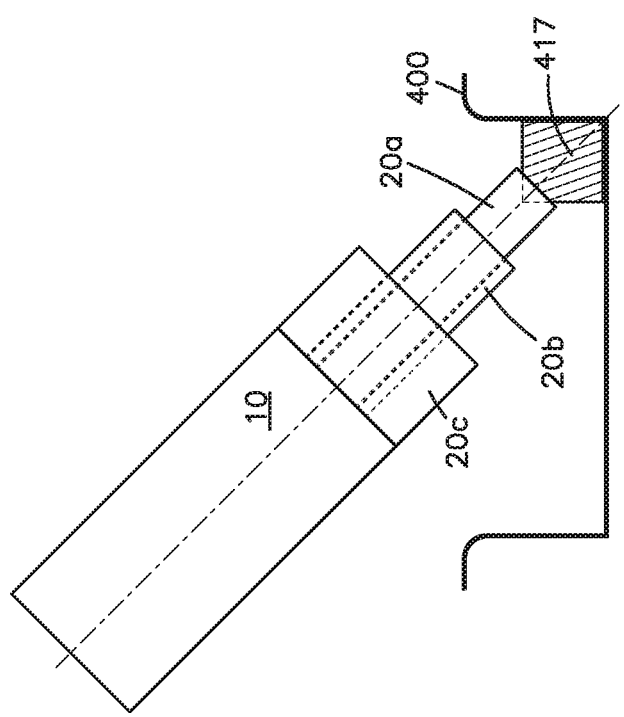

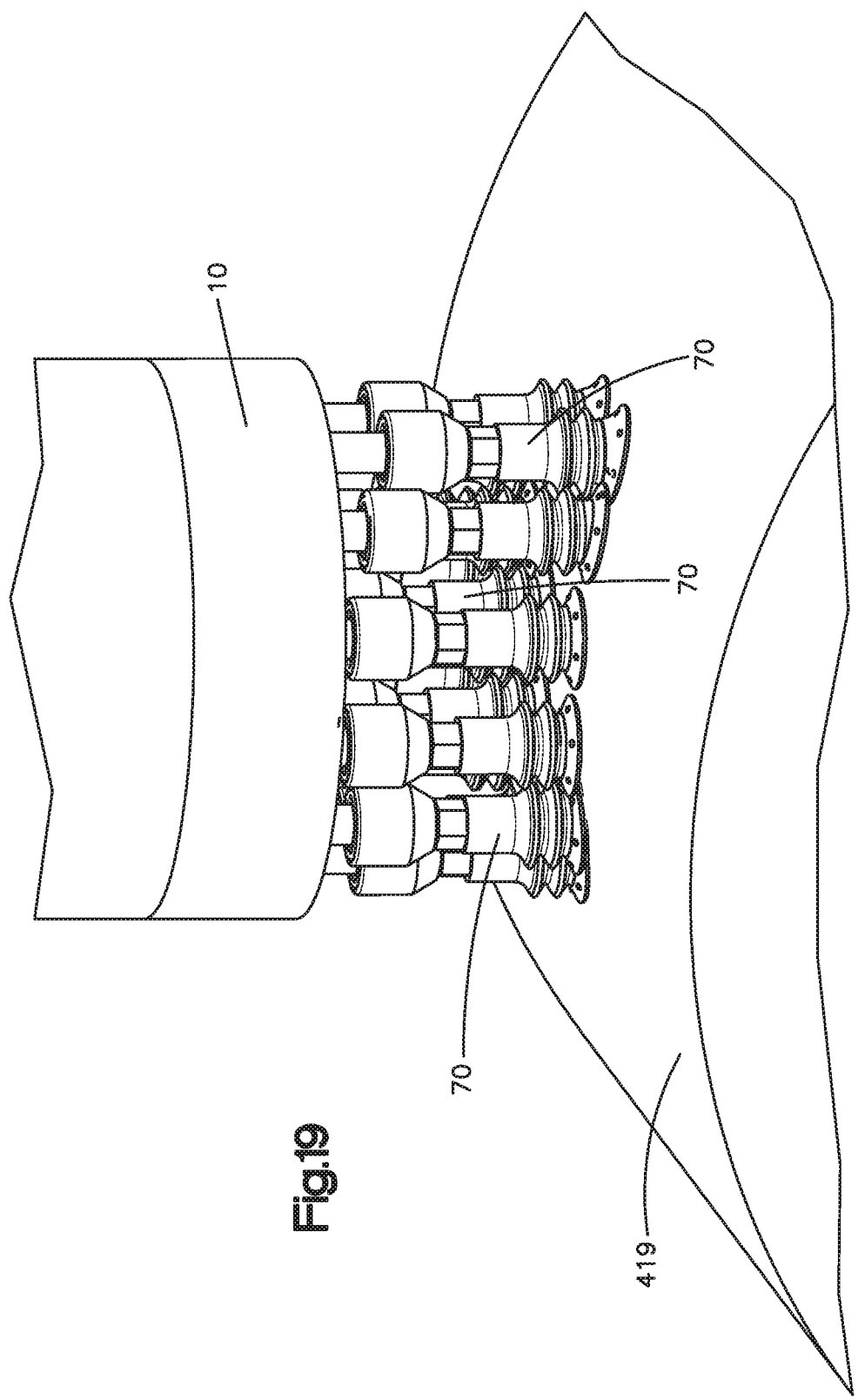

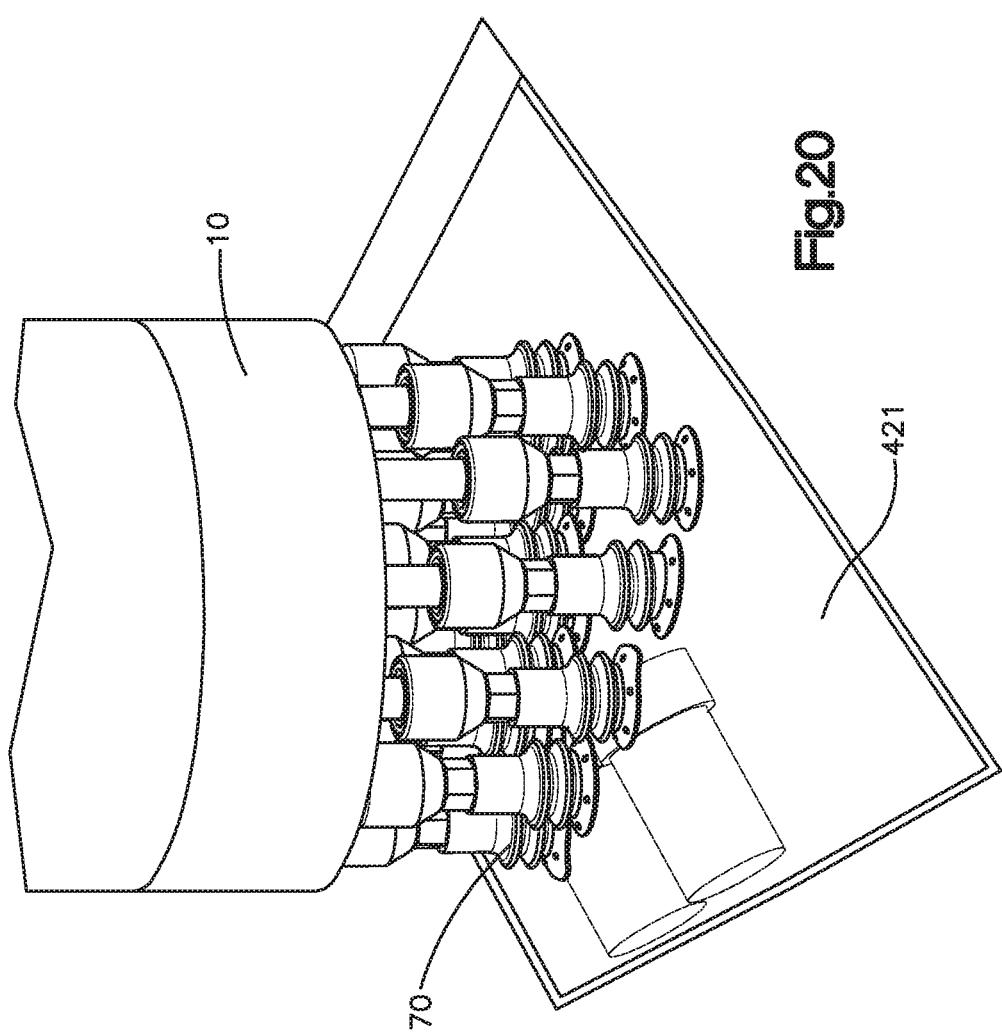

CONCENTRIC SUCTION CUP ARRAY INCLUDING ACTUATORS AND COMPLIANCE

BACKGROUND

The present invention relates to automation, and more particularly to tools for engaging and lifting items via vacuum suction cups.

The robotics field has developed many tools for engaging and lifting items at the end of an end effector. For example, end effectors sometimes employ suction cups for engaging a surface of an item and using a negative or suction pressure or vacuum to engage and lift the item.

Suction cup end-of-arm tools have some limitations, as the force created by the suction cup is limited by the magnitude of the negative pressure and suction cup area. In an environment in which many items of different shapes and sizes are expected to be encountered, a large suction cup may be blocked from the desired item by other items or the container in which the items may be located, or the item may be too small to engage the entire circumference of the suction cup. And a small suction cup may not be able to generate the force required to lift a heavier item.

BRIEF DESCRIPTION OF THE DRAWINGS

FIG. 16A is a schematic view of the toll of FIG. 1 engaging an object between adjacent objects.

FIG. 16B is another view of the tool of FIG. 16A, having lifted the object;

FIG. 16C is another view of the tool of FIG. 16A, transporting the object;

FIG. 16B is a view of the tool of FIG. 16A, showing the suction cup assemblies conforming to a cylinder;

FIG. 18 is a schematic view of an end-of-arm tool illustrating a center portion in an extended position engaging an object in a corner of a tote or like container;

FIG. 19 is a view of the tool of FIG. 1 confirming to a cylindrical object, illustrating longitudinal compliance of the suction cup assemblies and compliance of the suction cups;

and

Figure 1:
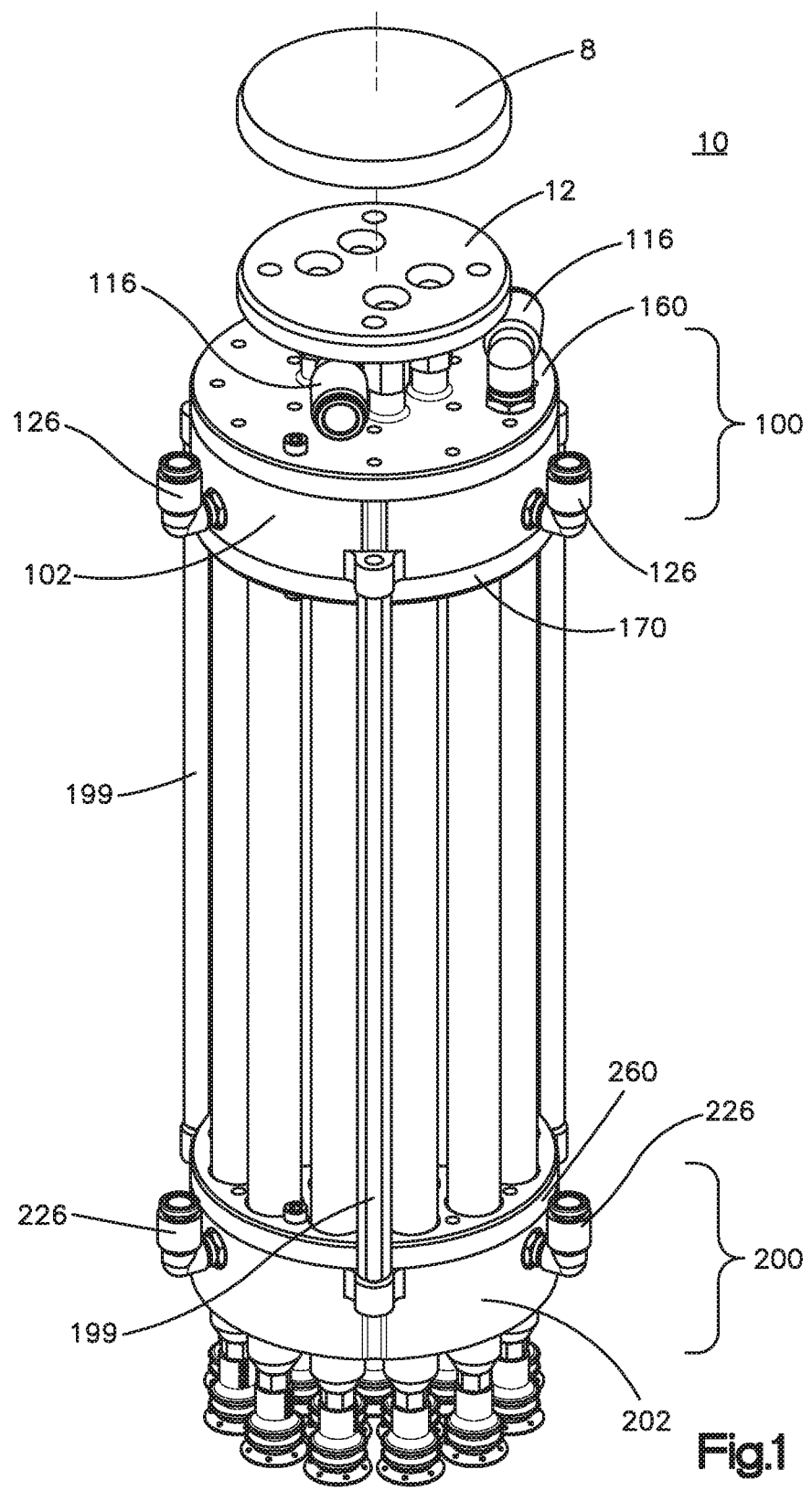
FIG. 1 is a top perspective view of an end-of-arm tool.

FIG. 20 is a view of the tool of FIG. 1 confirming to an irregularly shaped claim-shell package, illustrating longitudinal compliance of the suction cup assemblies and compliance of the suction cups.

DETAILED DESCRIPTION OF ILLUSTRATIVE EMBODIMENTS

End-of-tool arrays of concentric suction cup assemblies described herein have several advantages. The example of an inventive pneumatic actuator for each suction cup assembly is used to illustrate the advantages. For example, in an environment in which a target item (that is, an item that a control system has identified for the end effector to pick up) is together with other items or in which a target item is in a location that an array of suction cups cannot fit (such as a small item near a cover of a tote), an extendible center suction cup assembly (only) can engage the item without the surrounding cups either inadvertently grasping adjacent, not-targeted items or blocking the end-of-arm-tool ("EOAT") from accessing the item. Second, longitudinal compliance of the rings can in some cases enable the EOAT to comply with the shape of item, such as when the EOAT engages a rounded (especially spherical) or dished item. Moreover, because each suction cup assembly has its own actuator, the pneumatic suction cup array can be arranged to actuate in groups or one suction cup assembly at a time, as needed.

In this regard, an end-of-arm tool for lifting various items using vacuum pressure can include a center suction cup assembly comprising a center tube and a suction cup on a distal end of the center tube, and a ring of second suction cup assemblies outboard of the center suction cup assembly, and (in some embodiments) additional rings of third suction cup assemblies and fourth suction cup assemblies, each having a suction cup and linear actuator. The tool is configured to have a first position in which the center suction cup extends distally from the ring of second suction cups for engaging relatively small items and a second position in which the center suction cup is approximately co-planar with ring of second suction cups for engaging relatively large items. The tool also may have a third position in which the center suction cup is retracted or displaced relative to the second suction cups.

Each suction cup assembly is compliant in response to engaging an item from a force of an arm, which force may cause a piston or other actuator component to be linearly (longitudinally) displaced. And the suction cup itself is compliant to the shape of the item to be grasped. The linear displacement and/or suction cup compliance enables the suction cup array to conform to the shape of the object. Preferably, each one of the center suction cup assembly and each ring has its own controllable vacuum source, such as a vacuum manifold for supplying vacuum pressure to each ring as a unit. And preferably each ring has its own pneumatic pressure supply for actuating each ring as a unit. The suction cup can be of any type, such as a bellows, a compliant or compressible or deformable ring (such as a disk or cylinder), conical or curved, or other shape.

A method for lifting various items includes the steps of (a) positioning the end-of-arm tool such that suction cup assemblies are aligned with an item; (b) engaging the item such that a force applied on the item longitudinally depresses at least the center suction cup assembly and a portion of the second suction cup assemblies; (c) locking at least the depressed suction cup assembly in the depressed position; and (d) applying vacuum to at least one of the center suction cup assemblies and the ring of second suction cup assemblies. The center suction cup assembly can be extended or retracted relative to the ring of second suction cups, and the suction cup assemblies can be actuated in rings or individually.

A preferred embodiment of the actuation of the EOAT is pneumatic. A actuator assembly for use in an end-of-arm tool can include a housing and one or more concentric rings of pneumatic actuator assemblies, and an upper manifold. The housing can be an enclosure or any other structure for supporting the assembly.

Each one of the pneumatic actuator assemblies of each ring includes an upper pneumatic tube, a piston within the pneumatic tube, and a piston rod coupled to the piston rod. The upper manifold has an annular pneumatic plenum for each one of the concentric rings, whereby each one of the annular pneumatic plenums is in communication with actuators of a corresponding one of the rings for supplying pneumatic pressure thereto, whereby any one and the rings of suction cups assemblies can be independently pneumatically actuated. Each piston rod is configured to be rearwardly moveable relative to adjacent piston rods in response to engaging an object to adapt to the shape of the object and lockable in the adapted position.

The actuator can include a center pneumatic actuator assembly including an upper pneumatic tube, a piston within the pneumatic tube, and a piston rod coupled to the piston rod. The center pneumatic plenum is in communication with only the actuator for the center suction cup assembly for supplying pneumatic pressure thereto.

The pneumatic actuator assembly can have a suction cup. Alternatively, each ring of actuators can engage a concentric, compliant, annular vacuum cup. The piston rods of the pneumatic actuators can be coupled to the vacuum cup for longitudinal actuation of the vacuum cup, and the rearward movability of the piston rods and the compliance of the vacuum cup enable the vacuum cup to adapt to an object upon the vacuum cup engaging the object.

Referring to the figures to illustrate an example or embodiment of a tool, an end-of-arm tool 10 includes a bracket or fixture 12 for attaching to an arm. The arm moves and positions tool 10 according to particular goals of the system, as will be understood by persons familiar with automated or robotic picking. The term "arm" refers to any type of end effector, including without limitation a robotic arm, a gantry, and any other configuration capable of positioning the suction cup tool. The term end-of-arm" refers to the distal or working end of any kind of arm. In the embodiments in the figures, the suction cup assemblies are grouped together into rings 20a, 20b, and 20c, as explained more fully below. The present invention is not limited to a ring configuration, as preferably each suction cup assembly has its own actuator such that the suction cup assemblies can each be actuated individually or on groups chosen for the particular needs of the application.

Tool 10 includes an upper manifold assembly 100, a lower manifold assembly 200, a supporting structure, such a posts 199, and suction cup assemblies 20. In this regard, manifold 100 and 200 and posts 199 form a housing for the suction cup assemblies. Upper manifold assembly 100 distributes pneumatic (preferably positive pressure) air and vacuum to the suction cup assemblies 20. Upper manifold 100, which in the figures is connected to fixture 12, includes a manifold body 102, a top plate or cover 160, and a bottom plate or cover 170.

Manifold body 102 includes three concentric rings 110a, 110b, and 110c on its upper or top side, which rise from an upper side of center plate 150, and three concentric rings 120a, 120b, and 12c, which downwardly extend from an underside of center plate 150. In the embodiment of the figures, the upper rings 110a, 110b, and 110c, supply vacuum and the lower rings 120a, 120b, and 120c supply pneumatic pressure.

An innermost or first ring 110a is concentric around a longitudinal centerline of tool 10 and defines a topside center vacuum plenum 112a. In the embodiment shown in the figures, an aperture or through-hole 114a extends through center plate 150 and opens into center vacuum plenum 112a. Second ring 110b is outboard and concentric with first ring 110a such that the space between the (radial) outboard surface of first ring 110a and in the inboard surface of second ring 110b form second vacuum plenum 112b. In the embodiment shown in the figures, six equidistant through holes 114b are formed in a circular pattern through center plate 150. Through holes 114b open into second vacuum plenum 112b. Third ring 110c is outboard and concentric with second ring flab such that the outboard surface of second ring 110b and the inboard surface of third ring 110cv form third vacuum plenum 112c.

Figure 2:
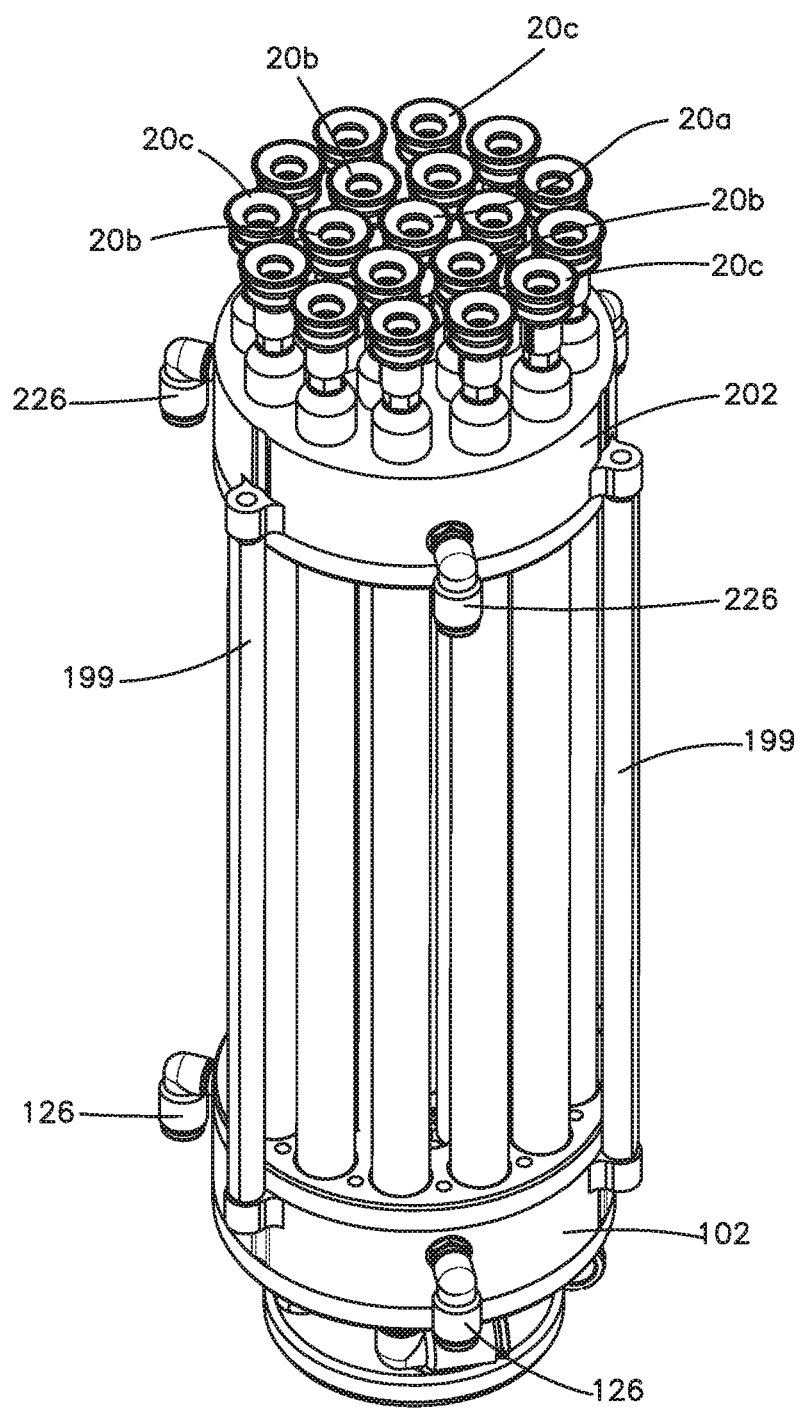
FIG. 2 is a bottom perspective view of the tool of FIG. 1.

In the embodiment shown in the figures, twelve equidistant through holes 114c are formed in a circular pattern through center plate 150. Through holes 114c open into third vacuum plenum 112c. Top cover 160 encloses each vacuum plenum 112a, 112b, and 112c. Top cover 160 includes openings therein for fittings (partially shown in FIG. 1) to supply vacuum individually to each one of the plenums 112a, 112b, and 112c. Thus, each vacuum plenum has a vacuum source that is controllable independently of the other vacuum plenums. Reference numbers 116 in FIGS. 1 and 2 illustrate fittings to which a vacuum source can be connected.

Referring to the underside of upper manifold 100, an innermost or first ring 120a is concentric around a longitudinal centerline of tool 10 and defines an underside center pneumatic plenum 122a. Second ring 120b is outboard and concentric with first ring 120a such that the space between the (radial) outboard surface of first ring 120a and in the inboard surface of second ring 120b form second pneumatic plenum 122b. Third ring 120c is outboard and concentric with second ring 120b such that the outboard surface of second ring 120b and the inboard surface of third ring 120c form third pneumatic plenum 122c. Bottom plate 170 encloses each one of the pneumatic plenums 122a, 122b, and 122c.

Figure 5:
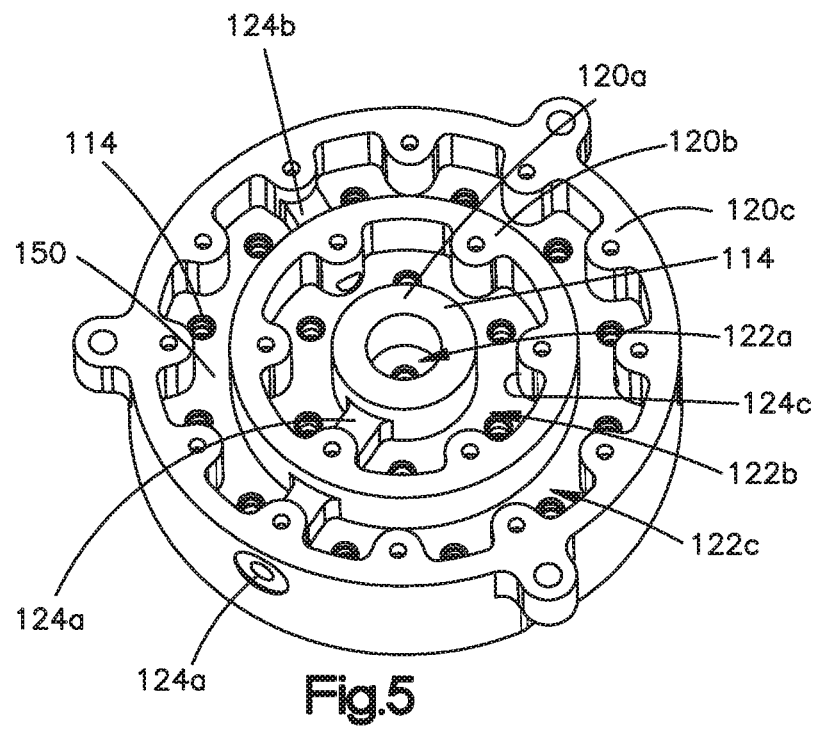
FIG. 5 is a perspective view of the underside of the top manifold isolated form the rest of the tool of FIG. 1.
Figure 6:
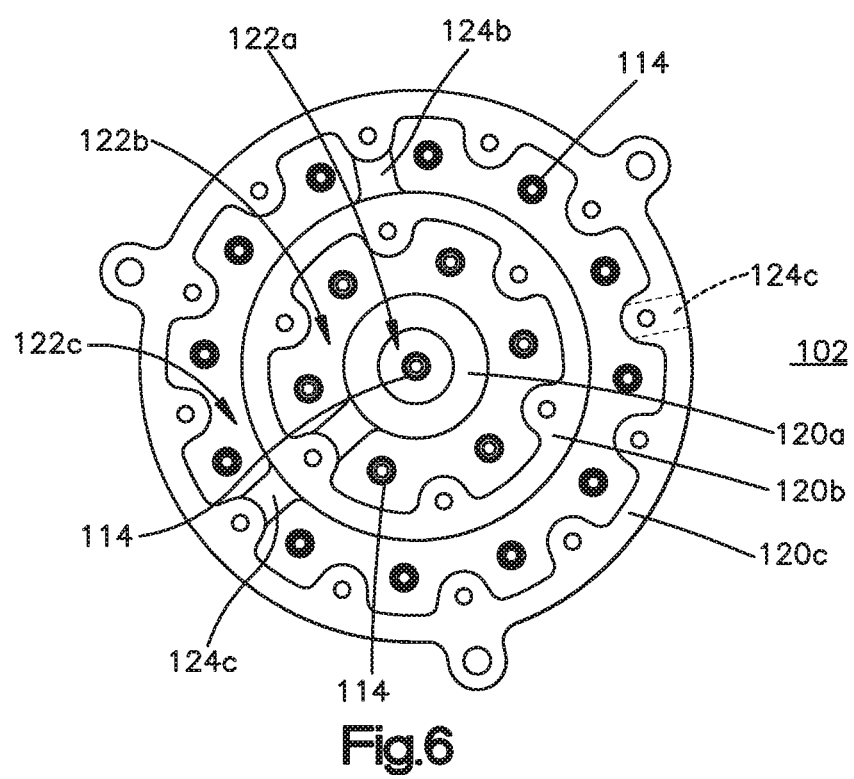
FIG. 6 is a plan view of the underside of the top manifold of FIG. 5.
Figure 7:
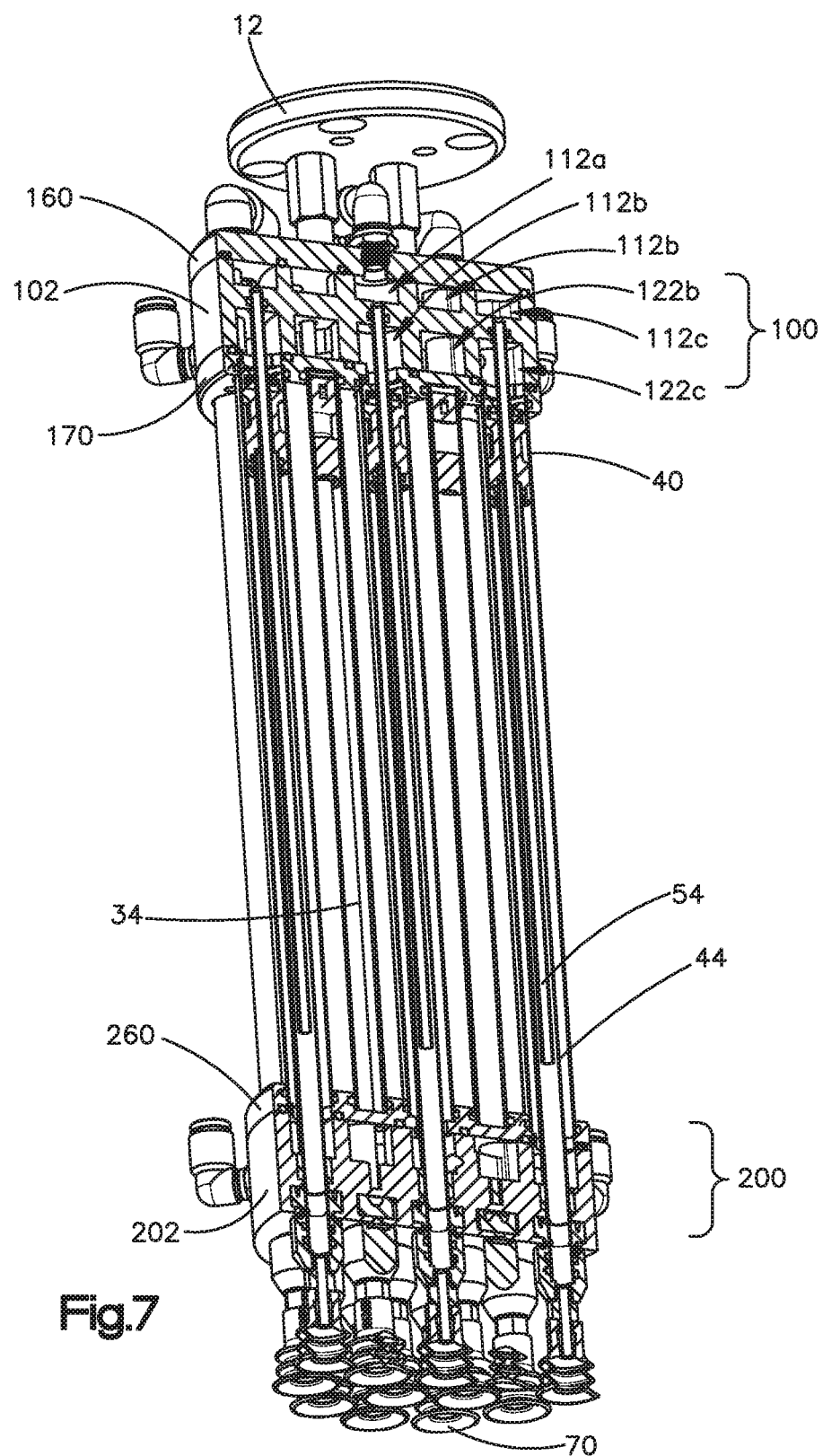
FIG. 7 is a perspective, longitudinal cross-sectional view of the tool of FIG. 1.
Figure 8:
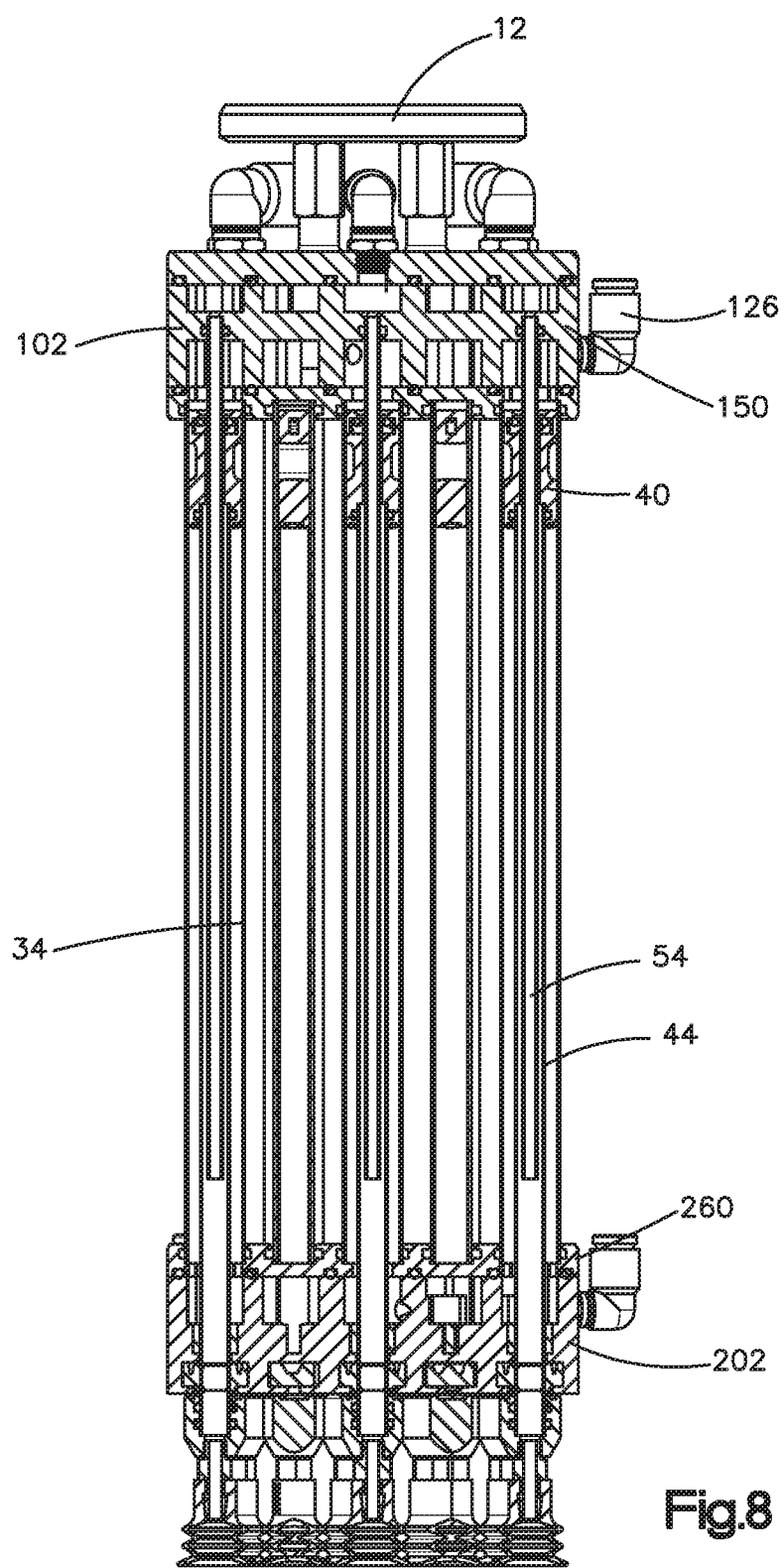
FIG. 8 is a longitudinal cross-sectional view of the cross section of FIG. 7.
Figure 9:
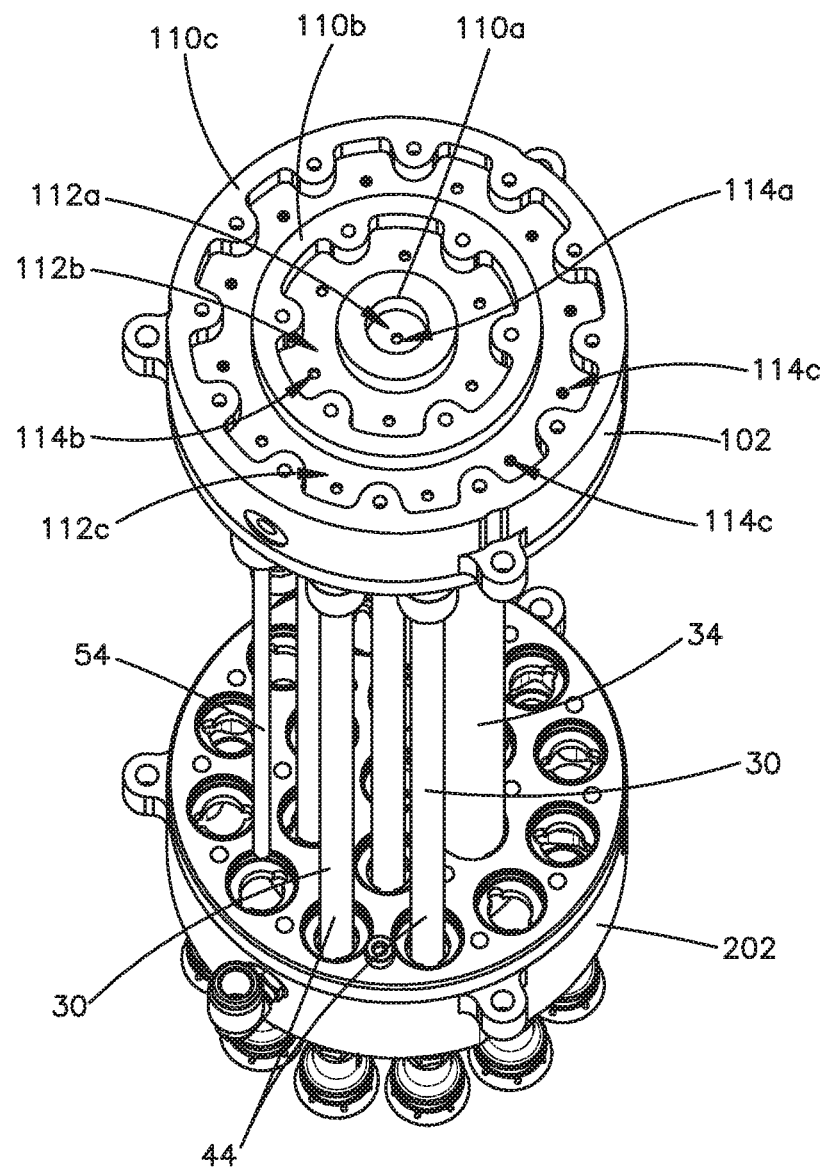
FIG. 9 is a top perspective view of the tool of FIG. 1, with some top components and suction sup assembly components removed for clarity.
Figure 10:
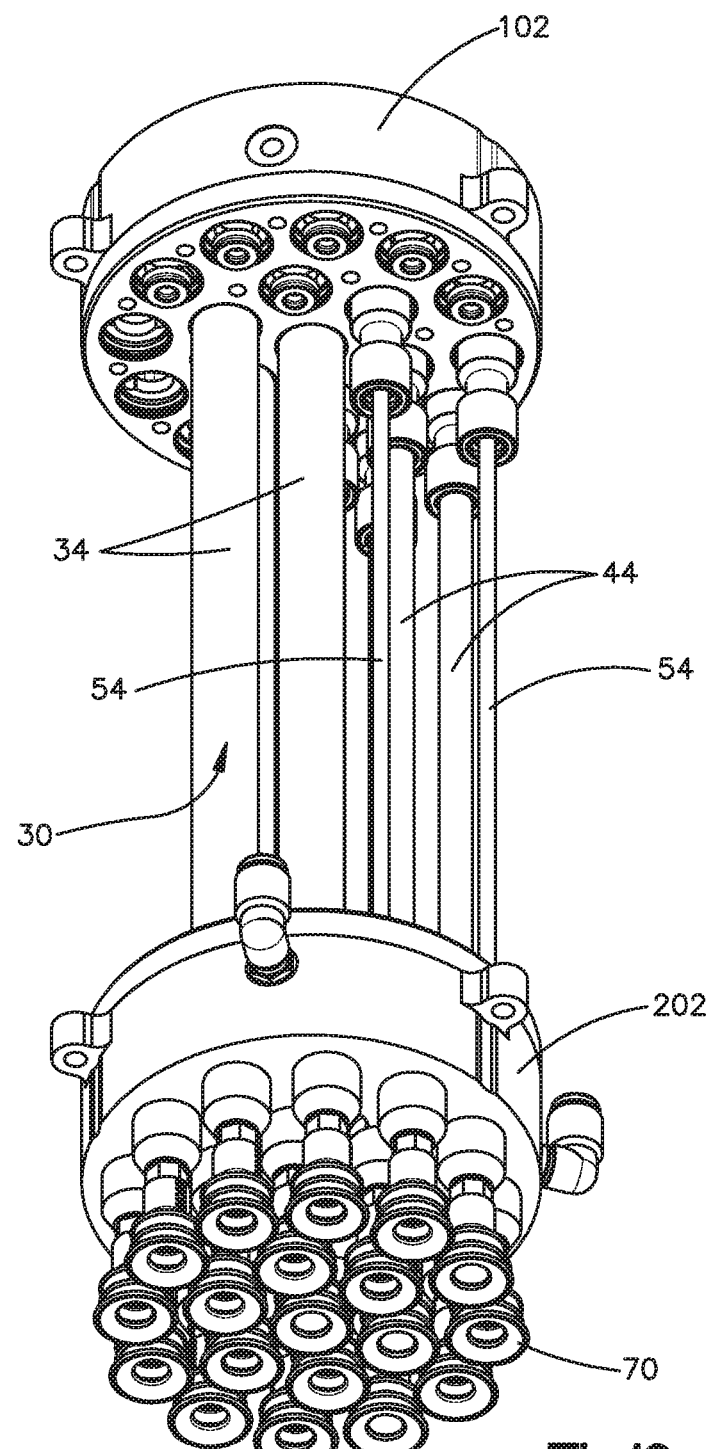
FIG. 10 is another perspective view of the tool shown in FIG. 9.
Figure 11:
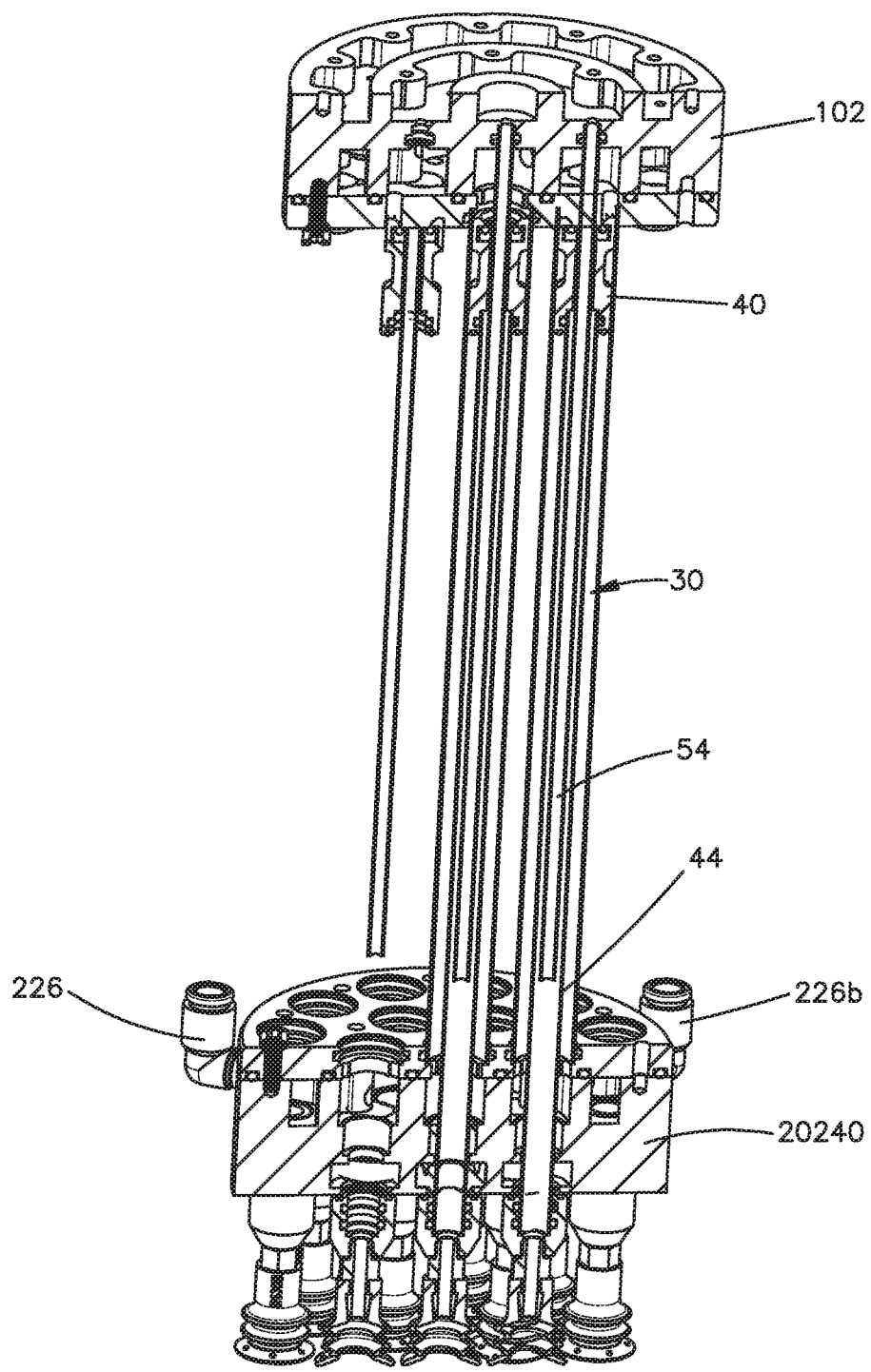
FIG. 11 is a perspective cross sectional view of the tool shown in FIG. 9.
Figure 12:
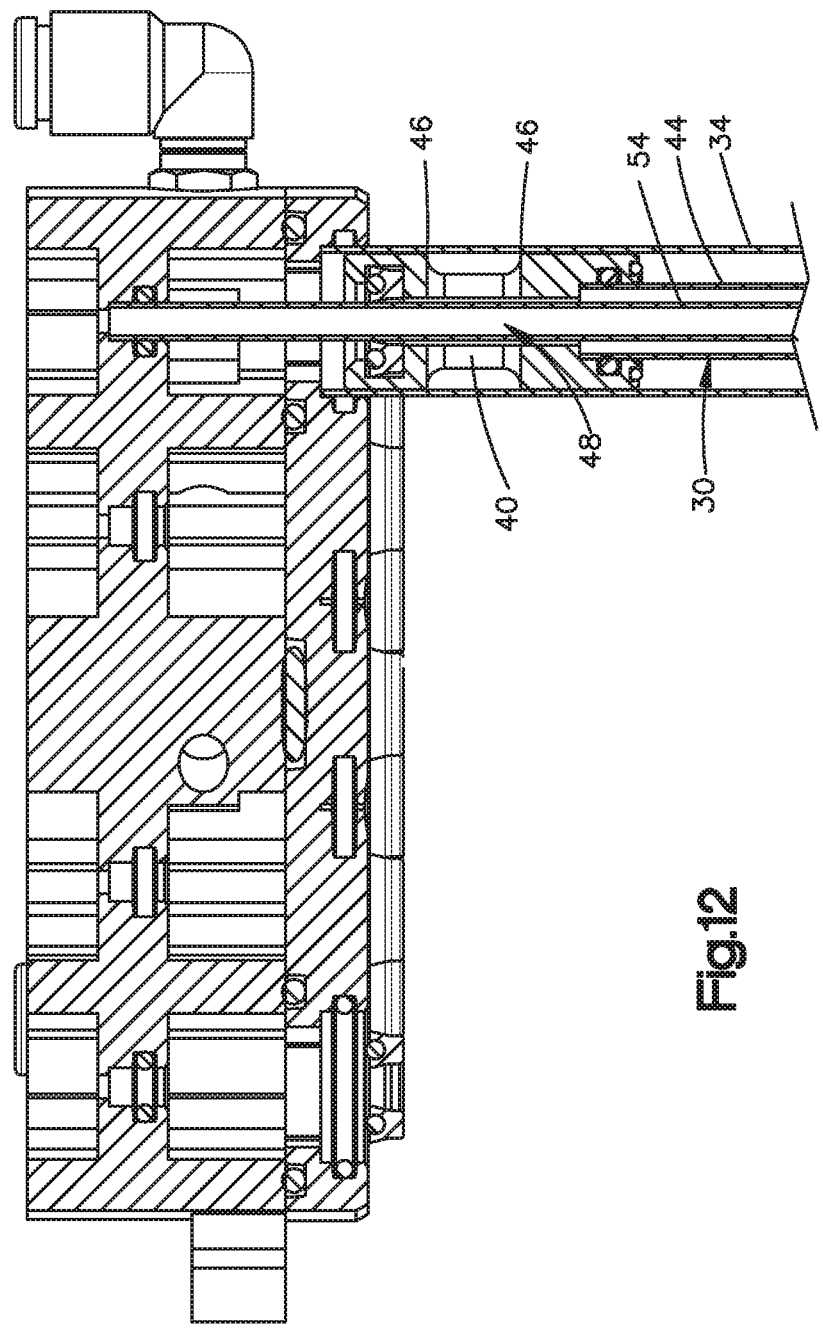
FIG. 12 is an enlarged longitudinal cross sectional view of an upper portion of the tool shown in FIG. 11.
Figure 13:
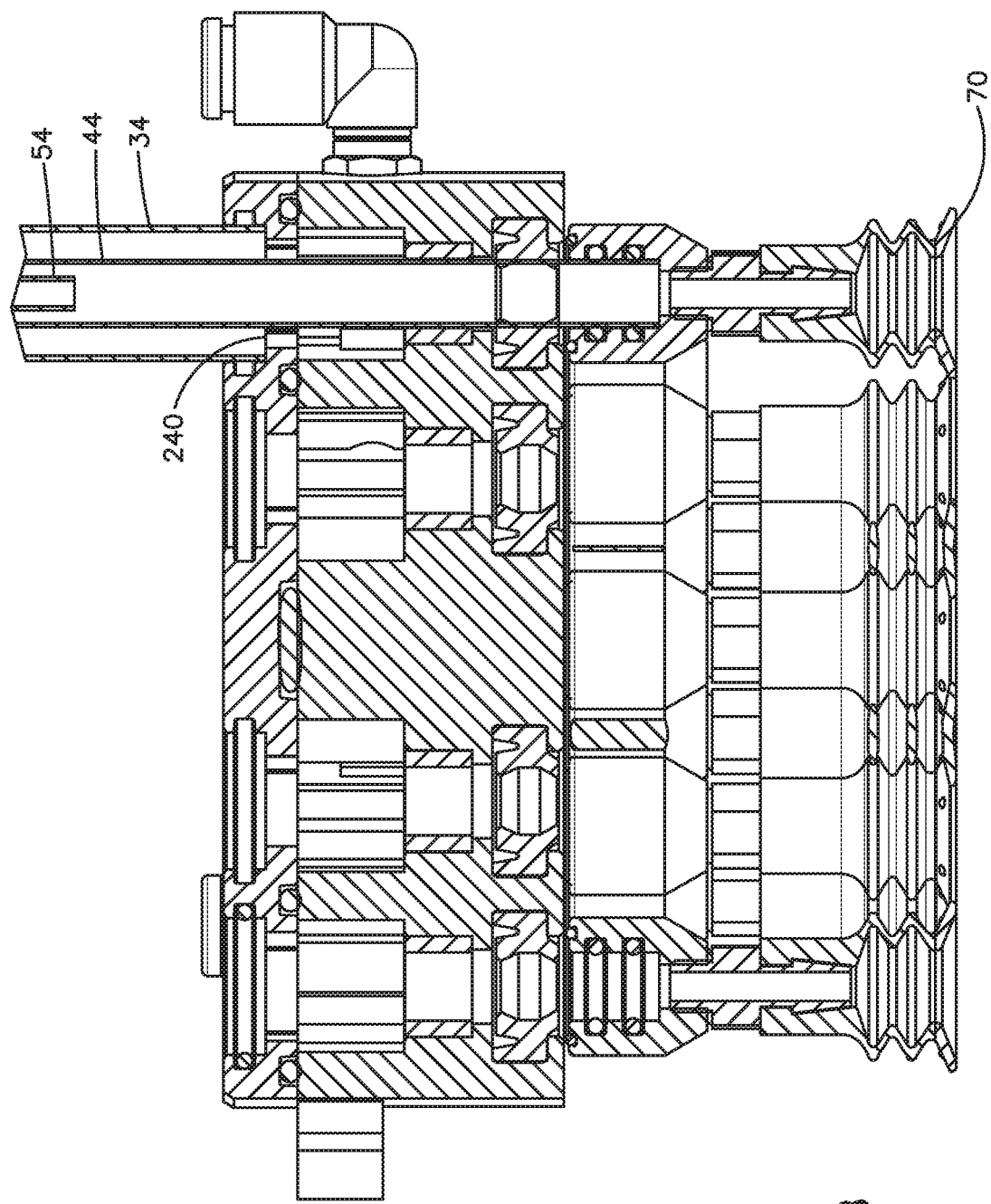
FIG. 13 is an enlarged longitudinal cross sectional view of a lower portion of the tool shown in FIG. 11.

Manifold 100 (FIGS. 5 and 6) includes passages or enclosed channels that connect pneumatic plenums 112a, 122b, and 122c to a compressed air source. As illustrated in FIG. 5, first channel 124a extends radially from the outermost wall of manifold 100 to open through first pneumatic ring 120a into inner pneumatic plenum 122a. Second channel 124b extends radially from the outermost wall of manifold 100 to open through second pneumatic ring 120b into second pneumatic plenum 122b. A third channel 124c extends through the outer wall of manifold 100 into third pneumatic plenum 122c, as in the embodiment of the figures, the outer wall of manifold 100 forms the outermost, circumferential boundary of third pneumatic plenum 122c (as well as third vacuum plenum 112c). Pneumatic air can be supplied independently to each plenum 122a, 122b, and 122c through the corresponding channel 124a, 124b, and 124c. Thus, each pneumatic plenum can be supplied with an air source that is controllable independently of the other pneumatic plenums. Reference numbers 126 in FIGS. 1 and 2 illustrate fittings to which pneumatic air can be connected.

Figure 3:
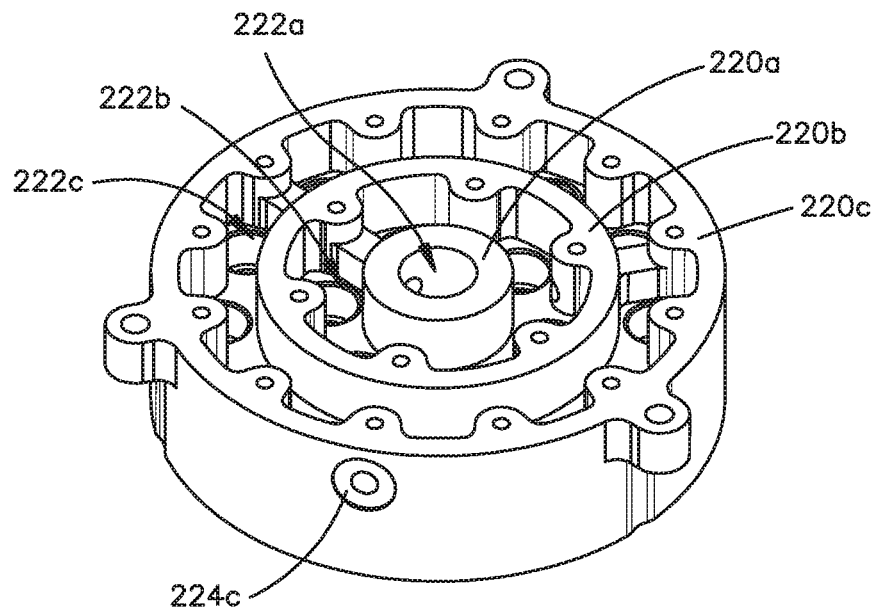
FIG. 3 is a topside, perspective view of the bottom manifold isolated from the rest of the tool of FIG. 1.
Figure 4:
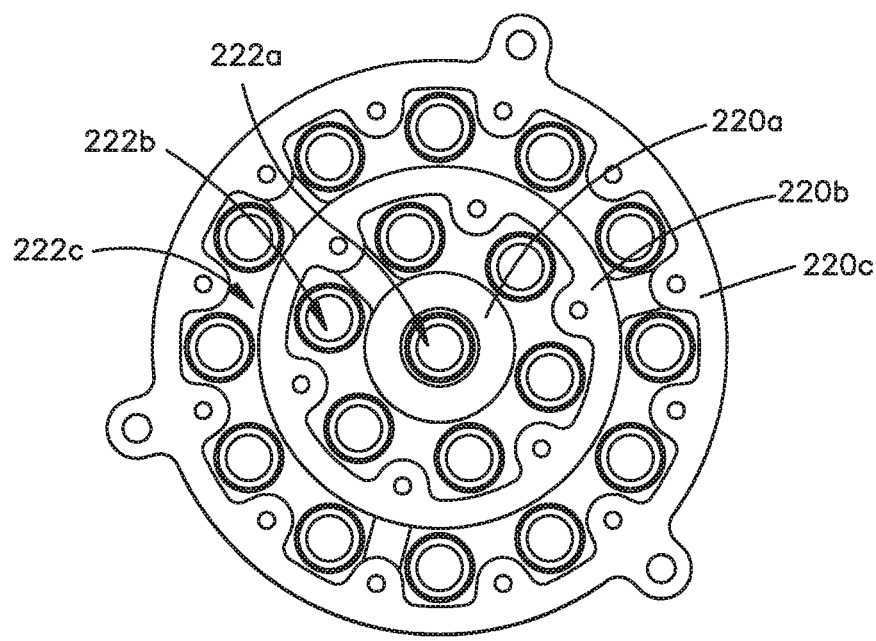
FIG. 4 is a plan view of the topside of the bottom manifold of FIG. 3.

Lower manifold assembly 200 (FIGS. 3 and 4) includes a manifold body 202 and a top plate or cover 270. Manifold body 202 includes three concentric rings 210a, 210b, and 210c on its upper or top side, which rise from an upper side of plate 250. An innermost or first ring 220a is concentric around a longitudinal centerline of tool 10 and defines a lower manifold, center pneumatic plenum 222a. Second ring 220b is outboard and concentric with first ring 220a such that the space between the (radial) outboard surface of first ring 220a and in the inboard surface of second ring 220b form second pneumatic plenum 222b. Third ring 220c is outboard and concentric with second ring 220b such that the outboard surface of second ring 220b and the inboard surface of third ring 220c form third pneumatic plenum 222c. Cover plate 270 encloses each one of the pneumatic plenums 222a, 222b, and 222c.

Manifold 200 includes passages or enclosed channels that connect pneumatic plenums 222a, 222b, and 222c to a compressed air source. As illustrated in FIG. 5, first channel 224a extends radially from the outermost wall of manifold 200 to open through first pneumatic ring 220a into inner pneumatic plenum 222a. Second channel 224b extends radially from the outermost wall of manifold 200 to open through second pneumatic ring 220b into second pneumatic plenum 222b. A third channel 224b extends through the outer wall of manifold 200 into third pneumatic plenum 222c, as in the embodiment of the figures, the outer wall of manifold 200 forms the outermost, circumferential boundary of third pneumatic plenum 222c (as well as third vacuum plenum 222c). Pneumatic air can be supplied independently to each plenum 222a, 222b, and 222c through the corresponding channel 224a, 224b, and 224c, Thus, each pneumatic plenum can be supplied with an air source that is controllable independently of the other pneumatic plenums. Manifold 200 also includes rings of through openings 216, which receive the suction cup assemblies 20. Reference numbers 226 in FIGS. 1 and 2 illustrate fittings to which pneumatic air can be connected.

The suction cup assemblies are arranged in concentric rings 20a, 20b, and 20c. When referring to the structure or function of any one of the suction cups, the reference number 20 (without an appended letter) is used. First ring 20a, in the embodiment shown in the figures, is a single suction cup assembly 20 aligned with the longitudinal centerline of the tool 10. Ring 20b is six suction cup assemblies 20 in a ring that is concentric with and outboard of first suction cup 20a. Ring 20c is concentric with concentric with and outboard of second ring 20c.

Referring to FIGS. 1-2 and 7-13, each suction cup assembly 20 includes an actuator, such as pneumatic actuator 30 that includes an actuator tube 34, a piston head 40, a piston rod 44. Suction cup assembly 20 also includes an inner suction tube 54 and a suction cup 70. Actuator tube 34 extends from the underside of upper manifold 100 to the topside of lower manifold 200. And upper end of each actuator tube 34 extends through bottom cover 170 to open into a corresponding one of the pneumatic plenums 122a, 122b, 122c. A lower end of each actuator tube 34 extends through cover 270 to open into a corresponding one of the pneumatic plenums 222a, 222b, 222c. Thus, each ring 20a, 20b, and 20c of the pneumatic tubes 34 is capable of receiving pneumatic air both its upper and its lower end. Appropriate seals between the pneumatic tubes 34 and manifolds 100 and 200 may be used.

A piston head 40 is positioned in each pneumatic tube 34 and includes seals 46 between piston head 40 and the interior surface of tube 34. Piston rod 44, which is hollow, is attached to the lower end of piston head 40 and moves up and down with piston head 40. Piston rod 44 extend through lower manifold 200, and suction cup 70 is attached to a distal (lowermost) end of piston rod 44.

Inner suction tube 54 is affixed is affixed to upper manifold 100 and extends through bottom cover 170 and the corresponding pneumatic plenum to engage plate 150 at a corresponding vacuum aperture 114. Inner suction tube 54 extends down the center of pneumatic tube 34 and passes through an aperture 48 in piston head 40. Inner suction tube 54 terminates at end 56 that can be spaced apart from manifold 200.

Suction cup 70 at the distal end of a piston rod 44 is illustrated in the figures as a bellows type. The term "suction cup," as used herein, encompasses any vacuum-type device. The center suction cup assembly 20a is illustrated as a single suction cup, but the present invention is not limited to a single suction cup at the center. For example, the term "center suction cup assembly" encompasses a tightly packed group of suction cups that function together. Suction cup 20a is referred to as "center," as it is at the center of the concentric rings 20b and 20c, and preferably on or near the longitudinal centerline of tool 10.

Figure 14:
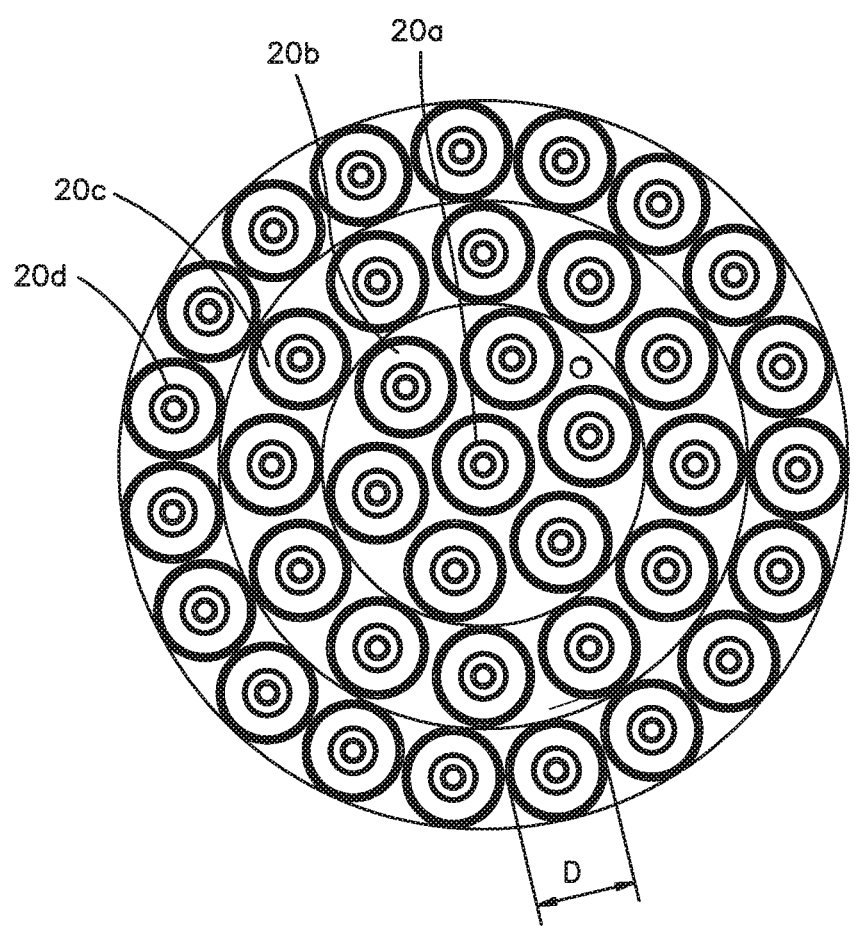
FIG. 14 is a bottom view of an alternative embodiment suction cup assembly, illustrating four concentric rings of suction cup assemblies.

The dimension D (FIG. 14) illustrates that a suction cup 70 has a diameter of one inch with minimal clearance between adjacent suction cups. Other configurations are contemplated. A specific dense pack of the suction cups is achieved with uniform suction cup diameters, oriented with one at the center, six in the first ring, and twelve in the next ring. Thus, FIGS. 1 and 2 shows 19 suction cups in a one-six-twelve concentric configuration. FIG. 14 illustrates an embodiment having a fourth ring 20d of suction cup assemblies to illustrate that the present invention is not limited to any particular number of rings. As will be understood by persons familiar with suction cup tools in view of the present disclosure, fourth ring 20d can have its own vacuum plenum, pneumatic plenum, and corresponding structures.

In operation, vacuum can be supplied to one or more vacuum plenums 112a, 112b, and 112c as desired. The vacuum is distributed about the ring and through apertures 114 to each one of the suction cup assemblies 20a, 20b, 20c associated with the corresponding plenum. In this regard, inner suction tube 54, which is coupled and sealed about aperture 114, transmits the vacuum pressure through the piston head 40 and into piston rod 44. And piston rod 44 transmits the vacuum pressure to suction cup 70. Thus, the vacuum pressure may be applied to each one or any combination of the rings 20a, 20b, and/or 20c.

Pneumatic air pressure can be supplied to one or more upper pneumatic plenum 122a, 122b, and 122c as desired. The pneumatic air pressure is distributed about the ring and into pneumatic tubes 34. Thus, upon applying pneumatic pressure to one of the plenums 122a, 122b, and 122c, space within the pneumatic tube 34, above the piston head 40, and outside of inner suction tube 54 is pressurized. The positive pressure above piston head can drive piston head 40 and piston rod 44 downwardly within tube 34, and in this regard extend suction cup 70 of the corresponding ring 20a, 20b, and/or 20c.

Pneumatic air can also be supplied to one or more of the lower pneumatic plenums 222a, 222b, 222c. The pneumatic air pressure is distributed about the ring and into pneumatic tubes 34. Thus, upon applying pneumatic pressure to one of the plenums 222a, 222b, and 222c, space within the pneumatic tube 34, below the piston head 40, and outside of piston rod 44 is pressurized. The positive pressure below piston head can drive piston head 40 upwardly within tube 34, and in this regard retract suction cup 70 of the corresponding ring 20a, 20b, and/or 20c. Further, pneumatic air pressure can be supplied to both ends of piston head 40 to lock the piston shaft into position. As the pressure above and below piston head 40 can be controlled, each suction cup assembly 20 can retract in response to a force applied to the tool and transmitted through actuator 30.

For example, if the EOAT controls identify a target object as small and/or lightweight, the vacuum pressure to outer rings 20b and 20c can be diminished or shut off, while the vacuum pressure applied to suction cup assembly 20a may be set to the desired magnitude for lifting the object. And if the EOAT controls identify a target that is large and/or heavy (that is, in this context, sufficiently heavy such that engagement by multiple suction cups is desired), the vacuum pressure to one or both of suction cup rings 20a and 20b may be provided (in addition to vacuum pressure to suction cup ring 20a). The vacuum supplied to vacuum connections 116a, 116b, and 116c may be provided and regulated by any means, such as conventional controls familiar to persons familiar with vacuum-type robotic tools.

Each one of or combination of rings 20a, 20b, and 20c of the suction cup assemblies may be extended and retracted together, yet independent of other ones of the rings. FIG. 1 illustrates the suction cup assemblies 20 in their fully retracted position. From the fully retracted position in FIG. 1, actuator 30 for innermost suction cup assembly 20a can extend suction cup assembly 20a from pneumatic pressure applied through upper manifold pneumatic plenum 122a, while rings 20b and 20c remain in their fully retracted positions. Suction cup assembly 20a can extend until piston head 40 reaches a shoulder 240 formed in lower manifold 200. Alternatively, the stop position of piston head 40 of suction cup assembly 20a can be controlled by applying pneumatic pressure, as needed, to lower manifold pneumatic plenum 222a to balance the pressure applied to upper manifold pneumatic plenum 122a. In this way, the pressure across (that is, above and below) piston head 40 can be equalized to stop the translation of piston head 40. Optionally, actuators 30 may include sensors to indicate the position of piston head 40.

Figure 15C:
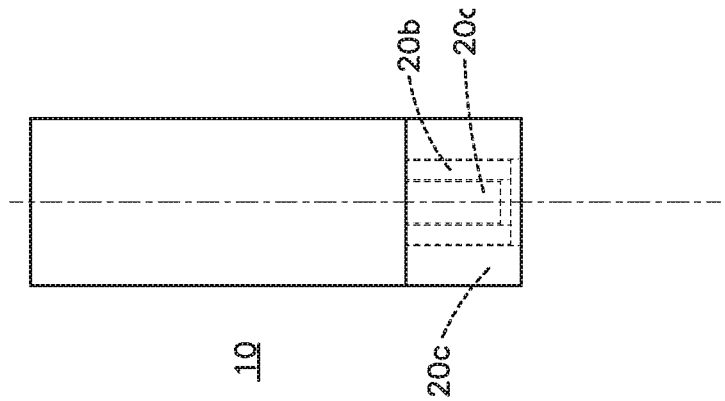
FIG. 15C is schematic view of the tool of FIG. 1 with the suction cups in the retracted position.
Figure 15B:
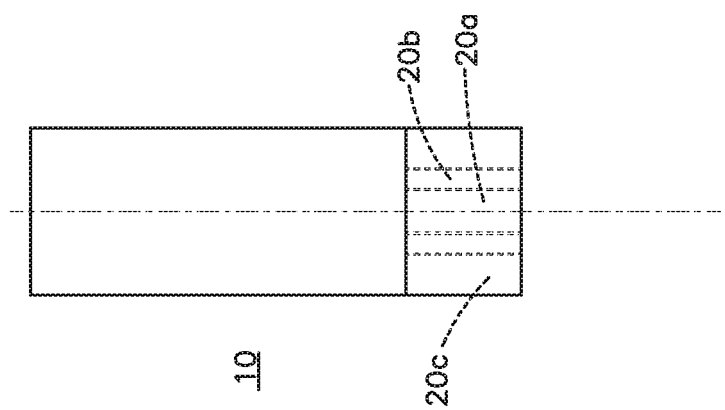
FIG. 15B is schematic view of the tool of FIG. 1 with the suction cups in the neutral position.
Figure 15A:
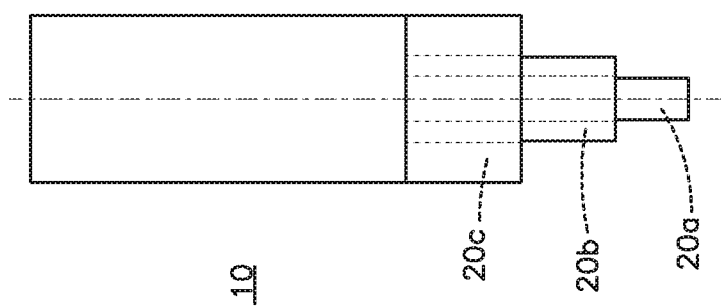
FIG. 15A is schematic view of the tool of FIG. 1 with the center suction cup in an extended position.

Similarly, rings 20a and 20b can be actuated and controlled by pneumatic pressure applied to plenums 122a and 122b, and by pneumatic pressure applied to plenums 222a and 222b, as needed. All rings 20a, 20b, and 20c (et al) can be actuated by pneumatic pressure to plenums 122a, 122b, and 122c, and by pneumatic pressure applied to plenums 22a, 222b, and 222c, Moreover, in some circumstances, the control system can extend outer ring 20c relative to second ring 20b, which in turn is extended beyond inner ring 20a, Which extension and positioning is achieved by applying pneumatic pressure to plenums 12a, 122b, 122c, 222a, 222b, and/or 222c as described above. FIG. 15A illustrates middle suction cup extended. FIG. 15B illustrates the rings 20a, 20b, and 20c located at the same position (such as in the fully retracted position of FIG. 1). The position of the suction cups 70 in FIG. 15B is also referred to as the neutral position. FIG. 15C illustrates the outer ring 15C extended.

In operation, an arm 8 (called out schematically in FIG. 1) may move tool 10 (such as longitudinally relative to the long axis of tool 10) until suction cups 70 engage the item. In some cases, information about the target item is already stored in or accessible to the control system, or the information is otherwise ascertainable by the computer vision system or the like, such that the weight and shape of the target item is known. For items that have an exposed face that is sufficiently flat to be engaged by center suction cup 20a, and that has a weight that is within the capacity of a single suction 20a (based on vacuum pressure, suction cup area, and expected air leakage between the item and suction cup), actuators 30 can be supplied with pneumatic air such that only inner suction cup assembly 20a is extended. Tool 10 can then merely engage the item with suction cup 20a. Air flow and/or pressure through tube 34 of suction cup assembly 20a can be monitored to confirm that the target item is held and lifted.

If the control system determines that the shape and weight of the target item are such that more than center suction cup assembly 20a is required, tool 10 can extend second ring 20b of suction cup assemblies such that rings 20a and 20b engage the item. And if the control system determines that addition suction is required, tool 10 can extent third ring 20c of suction cup assemblies such that rings 20a, 20b, and 20c engage the item.

In this regard, FIG. 16A illustrates center suction cup assembly 20a extended and engaging an item 412. FIG. 16B illustrates that, in addition to first suction cup assembly 20a, second ring 20b of suction cup assemblies extended and engaging and lifting item 412. As item 412 is positioned between items 411 and 413, third ring 20c of suction cup assemblies remains retracted.

Figure 17A:
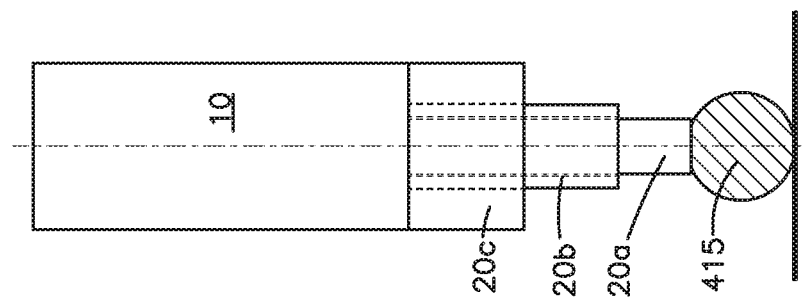
FIG. 17A is a schematic view of the tool of FIG. 1 in its extended position engaging an irregularly shaped object.
Figure 17B:
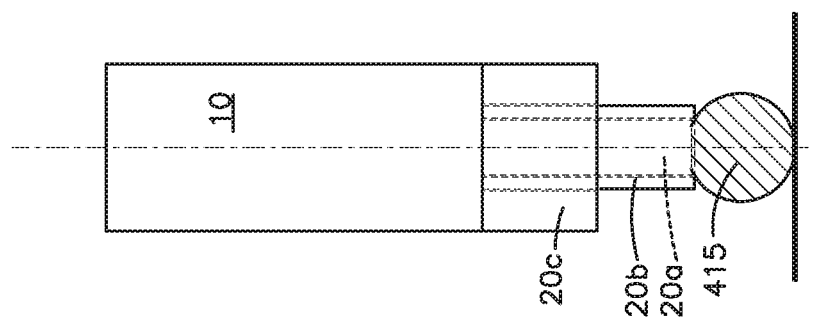
FIG. 17B is a schematic view of the tool of FIG. 17A illustrating the suction cup assembly compliance, moving toward a retracted position.
Figure 17C:
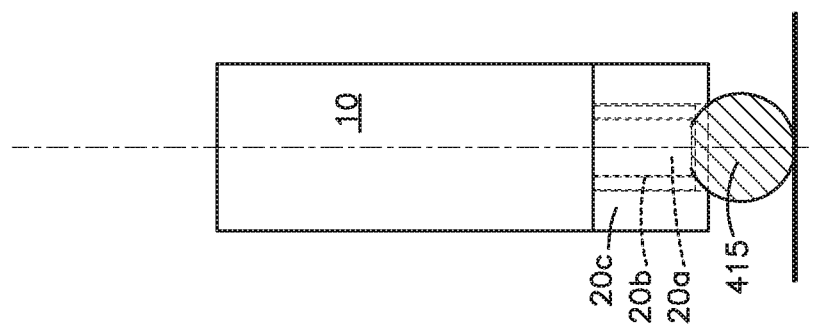
FIG. 17C is a schematic view of the tool of FIG. 17A showing the suction cup in compliance with the irregularly shaped object.
Figure 17D:
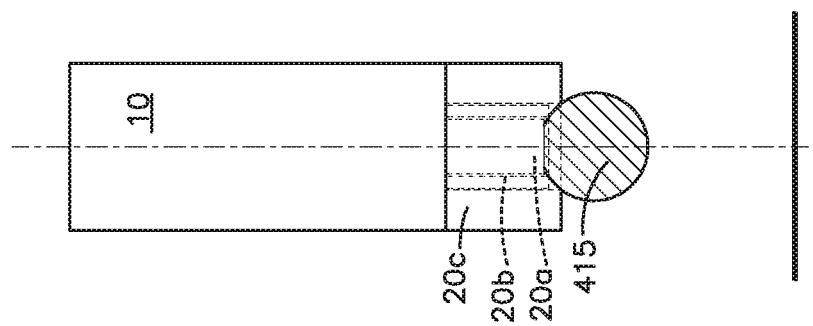
FIG. 17D is a schematic view of the tool of in its position shown in FIG. 17C relative to the object, with the tool having lifted the object.

FIG. 17A illustrates center suction cup assembly 20a engaging a spherical object 415. FIG. 17B illustrates second ring 20b engaging object 415 and extending past inner suction cup assembly 20a. FIG. 17C illustrates third ring 20c engaging object 415 and extending past second ring 20b. FIG. 17D illustrates lifting item 415.

FIG. 18 illustrates center suction cup assembly 20a extended and tool 10 positioned to enable suction cup assembly 20a to engage an item 417 that is positioned in a corner of a tote 400.

FIG. 19 illustrates suction cups 70 engaged with a cylindrical item 419. In this regard, the pneumatic pressure above and below the piston head 40 of each ring 20a, 20b, and 20b can be configured such that each individual suction cup assembly 20 is compliant—that is, retracts in response to a linear force applied to the suction cup assembly 20 upon engaging an item. In the embodiment of figures, the linear retraction is against or is resisted by the air pressure above piston head 40. Accordingly, the degree or magnitude of compliance can be chosen by the differential pressure across the piston head 40.

As illustrated in FIGS. 19 and 20, suction cups 70 are also compliant in that they can deform in response to engaging an item. As illustrated in FIG. 20, upon engaging a clamshell 421 having an irregularly shaped items (shown as pill bottles), some suction cup assemblies 20 retract in response to a force applied by the tool 10 by arm 08 and transmitted through the suction cup assemblies 20. Further, suction cups 70 comply with the irregular surface, as the cups locally deform.

The position and orientation of the end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces and no label may require only simple grasping strategies regardless of size and orientation. But items with more complex surfaces may be difficult to grasp, especially if these items are disposed in close proximity to other items and objects, such as when multiple items are disposed in a storage container such as a gaylord.

In some embodiments, the control system may receive data from one or more sensors (for example, optical, contact, proximity, etc.) disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multidimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The EOAT structure and function are described herein by referring to advantages and specific examples or embodiments. The present invention is not limited to the advantages explained herein, nor to the structure or function of the examples or embodiments. For merely one example, the problem of inadvertent removal of labels or deformation of films during handling is explained, and the application of the button can improve the function cups in this regard. However, the structure and function of the present invention is not limited to addressing the label or resilient film issues. Moreover, the text is intended to describe the specific embodiments shown in the figures. The structure and function shown and described is intended only for example. For non-limiting examples, the location and types of seals, the location of corresponding parts and their movements, and the function descriptions are not intended to limit the scope of the invention. Rather, it is intended that the invention be given the full scope of the plain meaning of the claims.

What is claimed:

1. A suction cup tool for an end of an robotic arm, the suction cup tool comprising:

a housing;

a center suction cup assembly comprising a lower suction tube, a compliant suction cup at a distal end of the lower suction tube, and an actuator for extending and/or retracting the lower suction tube; and one or more concentric rings of tightly packed suction cup assemblies around the center suction cup assembly, each one of the suction cup assemblies comprising a lower suction tube, a compliant suction cup at a distal end of the lower suction tube, and an actuator for extending and/or retracting the lower suction tube;

wherein each suction cup assembly is configured to be rearwardly moveable relative to adjacent suction cups in response to engaging an object and to be lockable such that a face of the tool is configured to adapt to a shape of the object and lockable in the adapted position; and wherein the center suction cup assembly has a first vacuum source and a first one of the one or more concentric rings has a second vacuum source such that vacuum to the center suction cup assembly and vacuum to the first one of the one or more concentric rings are independently controllable.

2. The suction cup tool of claim 1, wherein a second one of the one or more concentric rings includes a third vacuum source such that the vacuum to the second one of the one or more concentric rings is independently controllable.

3. An end-of-arm tool for an end of an robotic arm, the tool comprising:
  a housing;
  a center suction cup assembly comprising a lower suction tube, a compliant suction cup at a distal end of the lower suction tube, and a linear actuator;
  one or more concentric rings of suction cup assemblies around the center suction cup assembly, each one of the suction cup assemblies comprising a lower suction tube, a compliant suction cup at a distal end of the lower suction tube, and a linear actuator, each one of the linear actuators being a pneumatic actuator that includes a piston head in an actuator tube; and
  each suction cup assembly is configured to be rearwardly moveable relative to adjacent suction cups in response to engaging an object and lockable such that a face of the tool is configured to adapt to a shape of the object and lockable in the adapted position:
  whereby the linear actuators are configured such that the tool has a center extended position in which the center suction cup assembly is extended relative the ring of suction cup assemblies adjacent to the center suction cup assembly.

4. The tool of claim 3 the lower suction tube is attached to a piston head of the actuator, whereby translation of the piston head translates the suction cup.

5. The tool of claim 4 wherein the lower suction tube is concentric with and configured to translate relative to an upper suction tube, whereby vacuum is transmitted through the upper suction tube and through the lower suction tube to the suction cup, and wherein pneumatic pressure is transmitted to the piston through the actuator tube and outboard of the lower suction tube and upper suction tube.

6. The tool of claim 3, wherein the housing includes an upper manifold having a center pneumatic plenum and an annular pneumatic plenum for each one of the concentric rings, whereby the center pneumatic plenum is in communication with only an actuator for the center suction cup assembly for supplying pneumatic pressure thereto, and each one of the annular pneumatic plenums is in communication with actuators of a corresponding one of the rings for supplying pneumatic pressure thereto, whereby any one or combination of the center suction cup assembly and the rings of suction cups assemblies can be independently pneumatically actuated.

7. The tool of claim 6 wherein the upper manifold includes a center vacuum plenum and an annular vacuum plenum for each one of the concentric rings, whereby the center vacuum plenum is in communication with only an actuator for the center suction cup assembly for supplying vacuum pressure thereto, and each one of the annular vacuum plenums is in communication with actuators of a corresponding one of the rings for supplying vacuum pressure thereto, whereby any one or combination of the center suction cup assembly and the rings of suction cups assemblies can be independently supplied with vacuum.

8. The tool of claim 3 wherein each one of the actuators is a pneumatic actuator that is lockable by equalizing pneumatic pressure on opposing sides of a piston.

9. The tool of claim 3 wherein the suction cup includes a bellows or a compliant ring.

10. The tool of claim 3, wherein the tool is configured to have a neutral position in which the suction cups are approximately parallel, and a retracted position in which each ring is extended relative to a nearest inboard ring.

11. The tool of claim 10 wherein the one or more concentric rings are an inboard ring that is located about the center suction cup assembly and an outboard ring that is about the inboard ring.

12. A method for lifting various items comprising the steps of:
  (a) positioning the end-of-arm tool of claim 3 such that suction cup assemblies are aligned with an item;
  (b) engaging the item such that a force applied on the item longitudinally depresses at least the center suction cup assembly and a portion of the second suction cup assemblies; and
  (c) locking at least the depressed suction cup assembly in the depressed position; and
  (d) applying vacuum to at least one of the center suction cup assemblies and the ring of second suction cup assemblies.

13. The method of claim 12 wherein the engaging step (b) includes extending and/or retracting the center suction cup assembly relative to the ring of second suction cups.

14. The method of claim 12 the engaging step (c) includes extending and/or retracting the ring of second suction cups together as a unit.

15. A pneumatic actuator assembly for use in an end-of-arm tool, the actuator assembly comprising:
  a housing;
  one or more concentric rings of pneumatic actuator assemblies, each one of the pneumatic actuator assemblies of each ring comprising an upper pneumatic tube, a piston within the pneumatic tube, and a piston rod coupled to the piston rod:
  an upper manifold having an annular pneumatic plenum for each one of the concentric rings, whereby each one of the annular pneumatic plenums is in communication with actuators of a corresponding one of the rings for supplying pneumatic pressure thereto, whereby any one and the rings of suction cups assemblies can be independently pneumatically actuated;
  wherein each piston rod is configured to be rearwardly moveable relative to adjacent piston rods in response to engaging an object to adapt to a shape of the object and lockable in the adapted position.

16. The pneumatic actuator assembly of claim 15 further comprising a center pneumatic actuator assembly including an upper pneumatic tube, a piston within the pneumatic tube, and a piston rod coupled to the piston rod: the center pneumatic plenum is in communication with only the actuator for the center suction cup assembly for supplying pneumatic pressure thereto.

17. The pneumatic actuator assembly of claim 15 further comprising ai least one concentric, compliant, annular vacuum cup, each one of rings being associated with a corresponding one of the vacuum cups, the piston rods of the pneumatic actuators being coupled to the vacuum cup for longitudinal actuation of the vacuum cup, the rearward movability of the piston rods and the compliance of the vacuum cup enabling the vacuum cup to adapt to an object upon the vacuum cup engaging the object.

18. The pneumatic actuator assembly of claim 15, wherein the piston is lockable by equalizing pneumatic pressure on opposing sides of the piston.

* * * * *